Nov. 2, 1948. D. DUFFEY 2,452,913
METHOD OF PRODUCING CALCIUM HYDRIDES BY DISTILLATION
Filed April 11, 1944
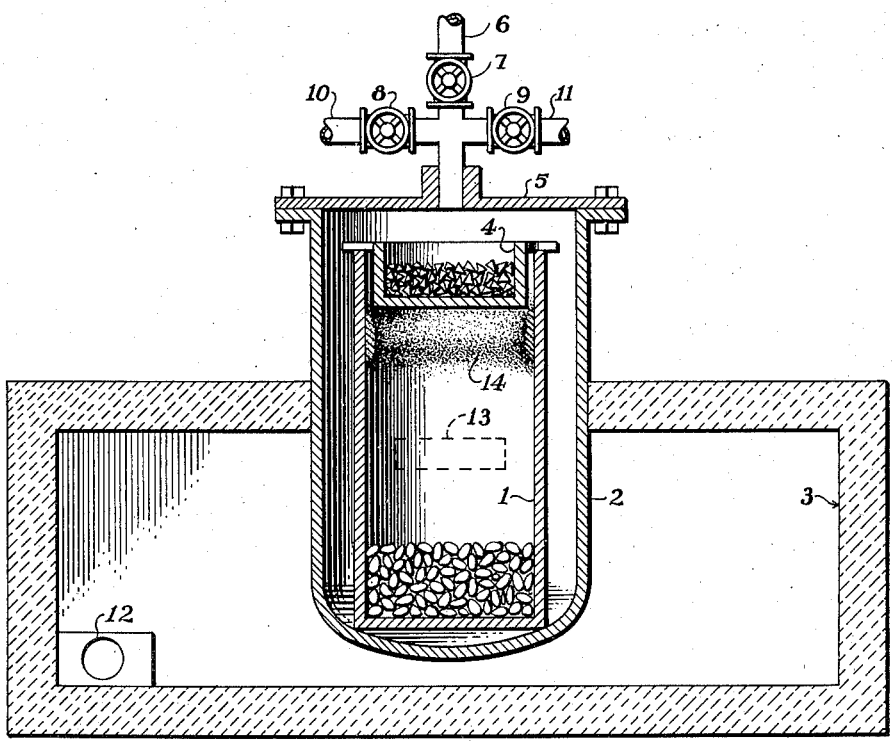
INVENTOR.
Dick Duffey.
BY
Robert A. Lavender Patented Nov. 2, 1948

2,452,913

UNITED STATES PATENT OFFICE 2,452,913

METHOD OF PRODUCING CALCIUM HYDRIDES BY DISTILLATION

Dick Duffey, La Fontaine, Ind., assignor to the United States of America as represented by the United States Atomic Energy Commission Application April 11, 1944, Serial No. 530,516

6 Claims. (Cl. 23—204)

This invention relates to new and useful improvements in the production of alkaline earth metal hydrides, and more particularly to the production of pure calcium hydride.

Prior to the present invention relatively pure calcium hydride has been produced by distilling a crude form of calcium in a suitable retort from which the air has been evacuated, and then reacting the distilled calcium metal with hydrogen to produce calcium hydride. One procedure that has proven satisfactory in the manufacture of such metal hydrides is disclosed in the copending application of Peter P. Alexander, Serial No. 478,094, filed March 5, 1943 United States Letters Patent No. 2,372,168 issued March 27, 1945.

While the calcium hydride produced in accordance with the foregoing method is relatively pure, it is desirable, in certain cases, to produce a calcium hydride of still higher purity. To accomplish this, it had been proposed to subject to distillation the calcium hydride obtained as previously described. Such proposals, however, have proven unsuccessful for the reason that the calcium hydride remains in a fused state in the bottom of the retort, and cannot be vaporized and condensed as a distillate.

It has been found necessary, therefore, to subject the distilled calcium metal to a second distillation before it is converted to the hydride form by reaction with hydrogen as previously set forth. This procedure, of course, requires that the retort in which the distilled calcium metal is produced be opened or that the distillate be removed therefrom, preparatory to redistillation, and since the distilled calcium produced contains certain small residual amounts of sodium and potassium impurities to an extent that renders the distillate highly pyrophoric, the retort could neither be opened, nor the distillate removed therefrom, for redistillation, without exposing the distillate to the air with resulting ignition of the material and complete loss of the charge.

With the foregoing in mind, the principal object of the present invention is to provide a novel method for producing extremely pure calcium hydride.

Another object of the invention is to provide a novel method for producing extremely pure calcium hydride by the redistillation of distilled calcium.

A further object of the invention is to provide a novel method for the production of pure calcium hydride wherein distilled calcium is rendered non-pyrophoric in air to permit handling thereof, without danger of ignition, preparatory to redistillation.

A still further object of the invention is to provide a novel method for the production of pure calcium hydride wherein distilled calcium is produced by a first distillation, is rendered non-pyrophoric in air, then subjected to a second distillation, and thereafter converted to the hydride form by reaction with hydrogen.

These and other objects of the invention, and the various features and details of the process or method thereof, are hereinafter fully set forth and described with reference to the accompanying drawing, in which the figure is a sectional view taken vertically through apparatus that may be employed advantageously in practicing the present invention.

The invention comprises essentially the steps of distilling relatively crude or impure calcium to produce relatively pure distilled calcium, rendering the distilled calcium thus produced substantially non-pyrophoric in air to permit removal or handling thereof, redistilling the distilled calcium to produce distilled calcium of still higher purity, and then reacting the redistilled calcium with hydrogen to produce calcium hydride of corresponding purity.

According to the present invention, initial distillation of the crude calcium may follow substantially the method disclosed in the aforesaid patent application of Peter P. Alexander. Thus, for example, and with reference to the accompanying drawing, a charge of calcium that is contaminated with impurities such as sodium and potassium, and various chlorides of these and other metals having a lower boiling point than calcium, is placed in the bottom of an inner retort 1 disposed within an outer retort 2 that is positioned within a heating furnace 3 so that the upper portion of the outer retort 2, as well as the upper portion of the inner retort 1, extend above and exteriorly of the furnace 3 as shown.

A quantity of a suitable refractory metal oxide such as, for example, titanium oxide is placed in a tray 4 that is supported across the open top of the inner retort 1, and a cover 5, that is removable, is placed upon the opening of the outer retort 2 and locked thereon to provide a sealed, airtight joint. The vertical branch 6 of a triple branch pipe system that leads interiorly of the outer retort 2 through the cover 5 thereof, is then connected to a suitable source of vacuum and, with the valve 7 of this branch 6 open and the valves 8 and 9 of the other branches 10 and 11 closed, the inner and outer retorts 1 and 2 are placed under a vacuum to remove objectional air therefrom.

Heating gases are now introduced into the furnace 3 through port 12 therein, where they circulate substantially around the outer retort 2 and then pass outwardly through the flue 13 to the exterior atmosphere. As the lower portion of the inner and outer retorts 1 and 2 are heated and the temperature rises, a temperature is reached at which the sodium and potassium vapors rise to the upper and cooler portion of the retort 1 where they come into contact with the metal oxide material in the tray 4. Due to their great affinity for oxygen, the sodium and potassium are promptly oxidized and the titanium oxide in tray 4 is reduced to titanium and a sub-oxide of titanium, according to reactions that may be indicated as follows:

$$4Na + TiO_2 \rightarrow 2Na_2O + Ti$$
$$2Na + 2TiO_2 \rightarrow Na_2O + Ti_2O_3$$
$$4K + TiO_2 \rightarrow 2K_2O + Ti$$
$$2K + 2TiO_2 \rightarrow K_2O + Ti_2O_3$$

As the temperature at the bottom of the inner retort continues to rise, a temperature is reached at which the calcium is distilled and the resulting calcium vapors rise and tend to condense and settle out against the upper wall portion of the inner retort immediately below the tray 4 as indicated at 14. Some of the calcium vapors, of course, may rise sufficiently to come in contact with the metal oxide in the tray 4, and may possibly react therewith in a manner similar to the sodium and potassium vapors, but the bulk of the distilled calcium is separately condensed and collected, as shown. A residue consisting essentially of calcium chloride admixed with a small amount of sodium chloride or potassium chloride, or both, remains as a residue at the bottom of the inner retort 1.

When distillation of the calcium has been complete, introduction of the heating gases to the furnace 3 is stopped and the retort allowed to cool to a temperature of from about 300° to 400° C. As previously stated, the distilled calcium that has condensed upon the wall of the inner retort 1 is relatively pure yet contains sufficient residual amounts of sodium and potassium impurities to render the distillate mass highly pyrophoric upon contact with air, and hence the distilled calcium mass must be rendered non-pyrophoric before the retort can be safely opened and the distilled calcium handled or removed preparatory to redistillation.

According to the present invention, therefore, when the retorts 1 and 2 have cooled to a temperature of between from about 300° to 400° C., carbon dioxide gas is introduced into the retorts 1 and 2, for example, through the branch pipe 10 under control of the valve 8 therein. Sufficient carbon dioxide gas is introduced into the retorts 1 and 2 until the pressure therein is brought to atmospheric pressure. The distilled calcium that is condensed and collected upon the wall of the retort 1 is in the form of clusters of dendritic crystals containing remaining traces of sodium and potassium, and the carbon dioxide gas introduced into the retorts reacts with the sodium and potassium, as well as the calcium distillate, to provide a thin layer or coating (possibly carbonates) upon the crystals that is inert and serves to prevent ignition of the sodium and potassium impurity traces and resultant burning and destruction of the condensed distillate upon contact thereof with air when the retort is opened for access to, or removal of, the distilled calcium preparatory to redistillation. The use of carbon dioxide gas in this manner has the added advantage of enabling the retort to cool considerably more rapidly for further processing of the distillate.

After introduction of the carbon dioxide gas as aforesaid, the retort is allowed to cool down to a temperature that will permit handling thereof, and the retort is then opened by removing the cover 5 from the outer retort 2. The oxidized impurities of sodium and potassium, and the titanium and its sub-oxide, as well as the residual chlorides remaining at the bottom of the inner retort 1, are removed from the apparatus, and the distilled calcium mass that has collected, as at 14, on the wall of the inner retort 1, is removed from the wall and either deposited at the bottom of said retort 1 or placed in another similar apparatus for redistillation.

Preferably, however, the distilled calcium is removed from the wall of the inner retort 1 and placed at the bottom of a similar clean retort 1 for redistillation in the same apparatus. Redistillation of the distilled calcium to further purify it by removal of the remaining traces of impurities may follow substantially the procedure employed in the first distillation stage, and, while a suitable oxide such as, for example, titanium oxide may be placed in the tray 4 to remove the remaining traces of sodium and potassium if desired, in most cases this is not necessary since the remaining sodium and potassium traces are sufficiently small that they may be ignored, and those impurities that are not readily distilled will remain as residue at the bottom of the retort 1.

In carrying out the redistillation, the cover 5 is secured on the retort 2 and the retorts are then evacuated to remove objectionable air through the branch pipe 6. Heating gases are introduced again into the furnace 3 and as the lower portions of the retorts are heated and the temperature thereof rises, a temperature is reached at which the distilled calcium at the bottom of the inner retort 1 vaporizes and passes upwardly through the retort to the top portion thereof where it condenses and settles out or collects upon the retort wall immediately below the tray 4, as indicated at 14.

Upon complete redistillation of the distilled calcium, the introduction of heating gases to the furnace 3 is stopped, and the retort is permitted to cool to a temperature at which the double-distilled calcium can be converted to calcium hydride without dissociation. At this temperature, the vacuum is broken by opening the valve 9 in the branch pipe 11 to admit hydrogen, and preferably a mixture of hydrogen and helium, to the interior of the retort, sufficient hydrogen being introduced to effect complete conversion of the condensed double-distilled calcium to calcium hydride. For this purpose, under practical operating conditions, the retort is allowed to cool to about 400° C. prior to introduction of the hydrogen.

The end of the reaction is indicated when a sufficient amount of hydrogen has been absorbed by a chemically equivalent weight of the double-distilled calcium. The retort is then cooled to room temperature, the hydrogen is displaced by air, and the retort is opened. Since substantially all of the sodium and potassium and other impurities have been removed, and all of the double-distilled calcium has been converted into the far less reactive calcium hydride, the danger of spontaneous ignition and combustion upon contact thereof with air upon opening of the retort is eliminated with the result that the double-distilled, pure calcium hydride may be removed from the retort with comparative safety.

It will be clear to those skilled in this art that the invention lends itself to numerous modifications. Thus, strontium and barium may be similarly treated to produce the pure hydride of such metals by removing sodium and potassium impurities therefrom, and converting these highly pyrophoric alkali metals into more stable compounds. Likewise, instead of titanium oxide as described, other suitable refractory metallic oxides, such as zirconium oxide and chromium oxide, may be employed, either separately or admixed.

From the foregoing, it will be observed that the present invention provides a novel method or process for producing pure calcium hydride wherein relatively pure distilled calcium that is highly pyrophoric, may be rendered substantially non-pyrophoric in air and therefore capable of being safely handled and exposed to air preparatory to further purification by redistillation.

While a particular embodiment of the invention has been set forth and described herein, it is not intended that the invention be limited to the disclosure, but that modifications and changes may be made and incorporated therein within the scope of the appended claims.

I claim:

1. In the method of producing an alkaline earth metal hydride of high purity by successive fractional distillations of a selected alkaline earth metal under a vacuum, the step which comprises introducing carbon dioxide gas into reactive contact with the alkaline earth metal distillate produced by each fractional distillation preceding final distillation to provide an inert coating on the distillate and render the same substantially non-pyrophoric in air, and introducing hydrogen into reactive contact with the alkaline earth metal distillate produced by the final distillation to convert the same to the corresponding alkaline earth metal hydride.

2. The method of producing a substantially pure alkaline earth metal hydride which comprises fractionally distilling in a closed chamber under vacuum an alkaline earth metal contaminated with pyrophoric metal impurities, oxidizing and collecting the distilled metal impurities, condensing the distilled alkaline earth metal as a solid separate from said oxidized impurities and alkaline earth metal residues, introducing carbon dioxide gas into reactive contact with said distilled alkaline earth metal to provide a protective covering therefor and render the same substantially non-pyrophoric in air, recovering said distilled alkaline earth metal, redistilling the distilled alkaline earth metal in a closed chamber under vacuum, condensing the redistilled alkaline earth metal as a solid separate from impurities and residues not removed by the first distillation, introducing hydrogen into reactive contact with said redistilled alkaline earth metal until the latter is converted to the alkaline earth metal hydride, and recovering the resulting pure alkaline earth metal hydride.

3. The method of producing an alkaline earth metal hydride of high purity which comprises heating an alkaline earth metal contaminated with a pyrophoric metal impurity of lower boiling point in the absence of air to a temperature at which the metal impurity is distilled, selectively oxidizing the resulting metal impurity by reaction with a refractory metallic oxide, collecting the oxidized metal impurity as a solid separate from the alkaline earth metal, distilling the alkaline earth metal, condensing the resulting alkaline earth metal vapor as a solid separate from the oxidized metal impurity and alkaline earth metal residues, introducing carbon dioxide gas into reactive contact with the alkaline earth metal distillate to provide an inert coating thereon and render the same substantially non-pyrophoric in air, recovering and redistilling said alkaline earth metal distillate, condensing said redistilled alkaline earth metal vapor as a solid separate from impurity and alkaline earth metal residues, cooling the condensed redistilled alkaline earth metal to a temperature at which it reacts with hydrogen, bringing hydrogen into reactive contact with the redistilled alkaline earth metal until it is converted into the alkaline earth metal hydride, and recovering the resulting pure alkaline earth metal hydride.

4. In the method of producing calcium hydride of high purity by successive fractional distillations of calcium under a vacuum, the step which comprises introducing carbon dioxide gas into reactive contact with the calcium distillate produced by each fractional distillation preceding the final distillation to provide an inert coating on the distillate and render the same substantially non-pyrophoric in air, and bringing hydrogen into reactive contact with the calcium distillate produced by the final distillation to convert the same to calcium hydride.

5. The method of producing a substantially pure calcium hydride which comprises fractionally distilling in a closed chamber under vacuum calcium contaminated with pyrophoric metal impurities, oxidizing and collecting the distilled metal impurities, condensing the distilled calcium as a solid separate from said oxidized impurities and calcium residues, introducing carbon dioxide gas into reactive contact with said distilled calcium to provide a protective covering therefor and render the same substantially non-pyrophoric in air, recovering said distilled calcium, redistilling the distilled calcium in a closed chamber under vacuum, condensing the redistilled calcium as a solid separate from impurities and residues not removed by the first distillation, introducing hydrogen into reactive contact with said redistilled calcium until the latter is converted to calcium hydride, and recovering the resulting pure calcium hydride.

6. The method of producing calcium hydride of high purity which comprises heating calcium contaminated with a pyrophoric metal impurity of lower boiling point in the absence of air to a temperature at which the metal impurity is distilled, selectively oxidizing the resulting metal impurity by reaction with a refractory metallic oxide, collecting the oxidized metal impurity as a solid separate from the calcium, distilling the calcium, condensing the resulting calcium vapor as a solid separate from the oxidized metal impurity and calcium residues, introducing carbon dioxide gas into reactive contact with the calcium distillate to provide an inert coating thereon and render the same substantially non-pyrophoric in air, recovering and redistilling said calcium distillate, condensing said redistilled calcium vapor as a solid separate from impurity and alkaline earth metal residues, cooling the condensed redistilled calcium to a temperature at which it reacts with hydrogen, bringing hydrogen into reactive contact with the redistilled calcium until it is converted into the alkaline earth metal hydride, and recovering the resulting pure calcium hydride.

DICK DUFFEY.

No references cited.